US009639691B2

(12) United States Patent
Mohammed et al.

(10) Patent No.: US 9,639,691 B2
(45) Date of Patent: May 2, 2017

(54) DYNAMIC DATABASE AND API-ACCESSIBLE CREDENTIALS DATA STORE

(71) Applicant: VMware, Inc., Palo Alto, CA (US)

(72) Inventors: Intesar Mohammed, Santa Clara, CA (US); Nikunj Nemani, Sunnyvale, CA (US); Vishwas Nagaraja, Sunnyvale, CA (US); Annie Chen, Sunnyvale, CA (US); Rakesh Sinha, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 257 days.

(21) Appl. No.: 14/316,517

(22) Filed: Jun. 26, 2014

(65) Prior Publication Data
US 2015/0379259 A1 Dec. 31, 2015

(51) Int. Cl.
G06F 21/45 (2013.01)
G06F 21/44 (2013.01)
G06F 21/53 (2013.01)
H04L 29/06 (2006.01)

(52) U.S. Cl.
CPC .............. G06F 21/45 (2013.01); G06F 21/44 (2013.01); G06F 21/53 (2013.01); H04L 63/08 (2013.01)

(58) Field of Classification Search
CPC ...................................................... G06F 21/45
See application file for complete search history.

(56) References Cited

U.S. PATENT DOCUMENTS

| 4,975,836 A | 12/1990 | Hirosawa et al. |
| 6,691,113 B1 * | 2/2004 | Harrison ........... G06F 17/30887 |
| 7,068,680 B1 | 6/2006 | Kaltenmark et al. |
| 7,549,149 B2 | 6/2009 | Childress et al. |
| 8,171,470 B2 | 5/2012 | Goldman et al. |
| 8,495,611 B2 | 7/2013 | McCarthy et al. |
| 8,732,699 B1 | 5/2014 | Hyser et al. |
| 8,782,744 B1 * | 7/2014 | Fuller ..................... G06F 21/52 |
| | | 709/225 |
| 9,081,747 B1 | 7/2015 | Tabieros et al. |

(Continued)

FOREIGN PATENT DOCUMENTS

| EP | 2383652 A1 | 11/2011 |
| KR | 2012-0013074 A | 2/2012 |

(Continued)

OTHER PUBLICATIONS

International Search Report and Written Opinion PCT/2015/033044, Dated Jul. 9, 2015, Consists of 9 pages.

(Continued)

Primary Examiner — William Powers

(57) ABSTRACT

A system for managing credentials for authenticating and securely communicating with trusted hosts, for example, in a cloud computing environment. The system dynamically updates credentials stored in a database and injects the updated credentials back into a runtime environment without restarting the runtime environment or applications running on the runtime environment. Embodiments of the present invention further enable credentials to be tracked and managed on a per-tenant basis, allowing each tenant that is running an application on a runtime environment to customize which hosts should be trusted.

17 Claims, 4 Drawing Sheets

(56) References Cited

U.S. PATENT DOCUMENTS

| | | | |
|---|---|---|---|
| 2002/0129242 A1* | 9/2002 | Abbott | H04L 9/0894 713/157 |
| 2003/0163686 A1* | 8/2003 | Ward | G06F 21/33 713/156 |
| 2006/0085785 A1 | 4/2006 | Garrett | |
| 2007/0168656 A1* | 7/2007 | Paganetti | G06F 21/31 713/155 |
| 2008/0114984 A1* | 5/2008 | Srinivasan | G06F 21/73 713/175 |
| 2008/0250407 A1 | 10/2008 | Dadhia et al. | |
| 2010/0049968 A1 | 2/2010 | Dimitrakos et al. | |
| 2010/0138823 A1 | 6/2010 | Thornley | |
| 2010/0205205 A1 | 8/2010 | Hamel | |
| 2011/0265164 A1 | 10/2011 | Lucovsky et al. | |
| 2011/0296021 A1 | 12/2011 | Dorai et al. | |
| 2012/0054280 A1 | 3/2012 | Shah | |
| 2012/0054736 A1 | 3/2012 | Arcese et al. | |
| 2012/0170726 A1* | 7/2012 | Schwartz | H04M 3/38 379/93.02 |
| 2012/0179822 A1 | 7/2012 | Grigsby et al. | |
| 2012/0198438 A1 | 8/2012 | Auer | |
| 2012/0221726 A1* | 8/2012 | Nguyen | H04L 61/2575 709/225 |
| 2012/0240112 A1 | 9/2012 | Nishiguchi et al. | |
| 2013/0103837 A1 | 4/2013 | Krueger | |
| 2013/0191528 A1 | 7/2013 | Heninger et al. | |
| 2013/0227091 A1 | 8/2013 | Tompkins | |
| 2013/0227560 A1 | 8/2013 | McGrath et al. | |
| 2013/0232480 A1 | 9/2013 | Winterfeldt et al. | |
| 2013/0232497 A1 | 9/2013 | Jalagam et al. | |
| 2013/0232498 A1 | 9/2013 | Mangtani et al. | |
| 2013/0263209 A1 | 10/2013 | Panuganty | |
| 2013/0268674 A1 | 10/2013 | Bailey et al. | |
| 2013/0297964 A1 | 11/2013 | Hegdal et al. | |
| 2014/0013315 A1 | 1/2014 | Genevski et al. | |
| 2014/0019538 A1 | 1/2014 | Limpaecher et al. | |
| 2014/0019621 A1 | 1/2014 | Khan et al. | |
| 2014/0033200 A1 | 1/2014 | Tompkins | |
| 2014/0082166 A1 | 3/2014 | Robinson et al. | |
| 2014/0101318 A1 | 4/2014 | Ferris et al. | |
| 2014/0201218 A1 | 7/2014 | Catalano et al. | |
| 2014/0201345 A1 | 7/2014 | Abuelsaad et al. | |
| 2014/0215049 A1 | 7/2014 | Provaznik | |
| 2014/0279201 A1 | 9/2014 | Iyoob et al. | |
| 2014/0280975 A1 | 9/2014 | Mordani et al. | |
| 2014/0325068 A1 | 10/2014 | Assuncao et al. | |
| 2014/0365662 A1 | 12/2014 | Dave et al. | |
| 2015/0163288 A1 | 6/2015 | Maes et al. | |
| 2015/0347264 A1 | 12/2015 | Mohammed et al. | |
| 2015/0350101 A1 | 12/2015 | Sinha et al. | |

FOREIGN PATENT DOCUMENTS

| | | | |
|---|---|---|---|
| WO | 2013104217 A1 | 7/2013 | |
| WO | 2013184134 A1 | 12/2013 | |

OTHER PUBLICATIONS

International Search Report and Written Opinion PCT/2015/033394, Dated Jul. 21, 2015, Consists of 9 pages.
International Search Report and Written Opinion PCT/2015/032625, Dated Jul. 7, 2015, Consists of 9 pages.
International Search Report and Written Opinion PCT/2015/032924, Dated Dec. 31, 2015, Consists of 12 pages.
Chieu, "Solution-based Deployment of Complex Application Services on a Cloud", Jul. 2010, pp. 282-287.
U.S. Appl. No. 14/287,366, Final Office Action dated May 19, 2016.
U.S. Appl. No. 14/289,231, Final Office Action dated May 19, 2016.
U.S. Appl. No. 14/292,296, Office Action dated May 27, 2016.
U.S. Appl. No. 14/315,874, Final Office Action dated Jun. 17, 2016.
U.S. Appl. No. 14/316,507, Office Action dated Jun. 24, 2016.
U.S. Appl. No. 14/289,231, Office Action dated Dec. 1, 2016.
U.S. Appl. No. 14/292,296, Final Office Action dated Dec. 1, 2016.

* cited by examiner

DYNAMIC DATABASE AND API-ACCESSIBLE CREDENTIALS DATA STORE

BACKGROUND

Cryptographic protocols are commonly used by computing devices to securely transmit information over the Internet. Such protocols may implement various types of cryptographic keys to encrypt and/or decrypt communications, as well as certificates to enable a computing device to verify the identities of hosts with whom the computing device is communicating. These keys and certificates are generally stored in a credentials data store, such as a key store or a trust store, and are accessed by the computing device to generate one or more credentials managers, such as one or more key managers and/or trust managers. The credentials managers are then used to verify the identities of host devices and to transmit encrypted communications to, as well as receive encrypted communications from, the host devices.

In cloud computing applications, cryptographic protocols may be implemented by an application running on a virtual machine (VM) to enable the application to securely communicate with multiple hosts and determine whether communications received from a particular host should be trusted. For example, in multi-tiered cloud computing applications, a management application may use one or more trust managers to authenticate different hosts associated with one or more cloud computing platform providers.

During deployment of a multi-tiered application, various virtual machines (VMs) in hosts and/or cloud computing platform providers may be added to or removed from a listing of trusted hosts. As such, keys and/or certificates associated with the VMs in the hosts and cloud computing platform providers may be added to or removed from the credentials data store. In some cases, the management application may be executing in a runtime environment, such as a Java Virtual Machine (JVM), in which credentials managers are generated only when the runtime environment is launched and cannot be modified to add or remove keys and/or certificates while the runtime environment is running. Consequently, if new keys and/or certificates are received during execution of the management application, the runtime environment and, consequently, the application must be restarted in order to generate new credentials managers. As a result, adding or removing trusted hosts generally requires increased downtime and administrative costs.

Further, current runtime environment implementations typically allow only one set of credentials managers to be implemented for applications running on a particular runtime environment. Consequently, when multiple users are running an application or applications on a virtual machine, the users must share a single set of global credentials managers, preventing trusted hosts from being selected on a per-user basis. Accordingly, there are challenges faced by system administrators when attempting to update and manage keys and certificates to be used by a runtime environment.

SUMMARY

One or more embodiments of the present disclosure provide a system for managing credentials for authenticating and securely communicating with trusted hosts, for example, in a cloud computing environment. This system enables an administrator to dynamically update credentials stored in a database and inject the updated credentials back into a runtime environment without restarting the runtime environment or applications running on the runtime environment. Embodiments of the present disclosure further enable credentials to be tracked and managed on a per-tenant basis, allowing each tenant that is running an application on a runtime environment to customize which hosts should be trusted.

A method of managing credentials using a runtime environment, according to an embodiment, includes adding one or more keys to a first credentials data store included in a database using a first application programming interface (API) command and retrieving the one or more keys from the first credentials data store using a second API command. The method further includes generating a first credentials object based on the one or more keys retrieved from the first credentials data store and verifying first host credentials received from a first remote host by an application running on the runtime environment using the first credentials object.

A non-transitory computer-readable storage medium comprising instructions that, when executed in a computing device, manage credentials using a runtime environment, by performing the steps of, in an embodiment, adding one or more keys to a first credentials data store included in a database using a first application programming interface (API) command and retrieving the one or more keys from the first credentials data store using a second API command. The non-transitory computer-readable storage medium further includes instructions for generating a first credentials object based on the one or more keys retrieved from the first credentials data store and verifying first host credentials received from a first remote host by an application running on the runtime environment using the first credentials object.

A computer system for managing credentials using a runtime environment, the computer system comprising a system memory and a processor programmed to carry out the steps of, in an embodiment, adding one or more keys to a first credentials data store included in a database using a first application programming interface (API) command and retrieving the one or more keys from the first credentials data store using a second API command. The system memory and processor are further programmed to carry out the steps of generating a first credentials object based on the one or more keys retrieved from the first credentials data store and verifying first host credentials received from a first remote host by an application running on the runtime environment using the first credentials object.

DETAILED DESCRIPTION

Figure 1:
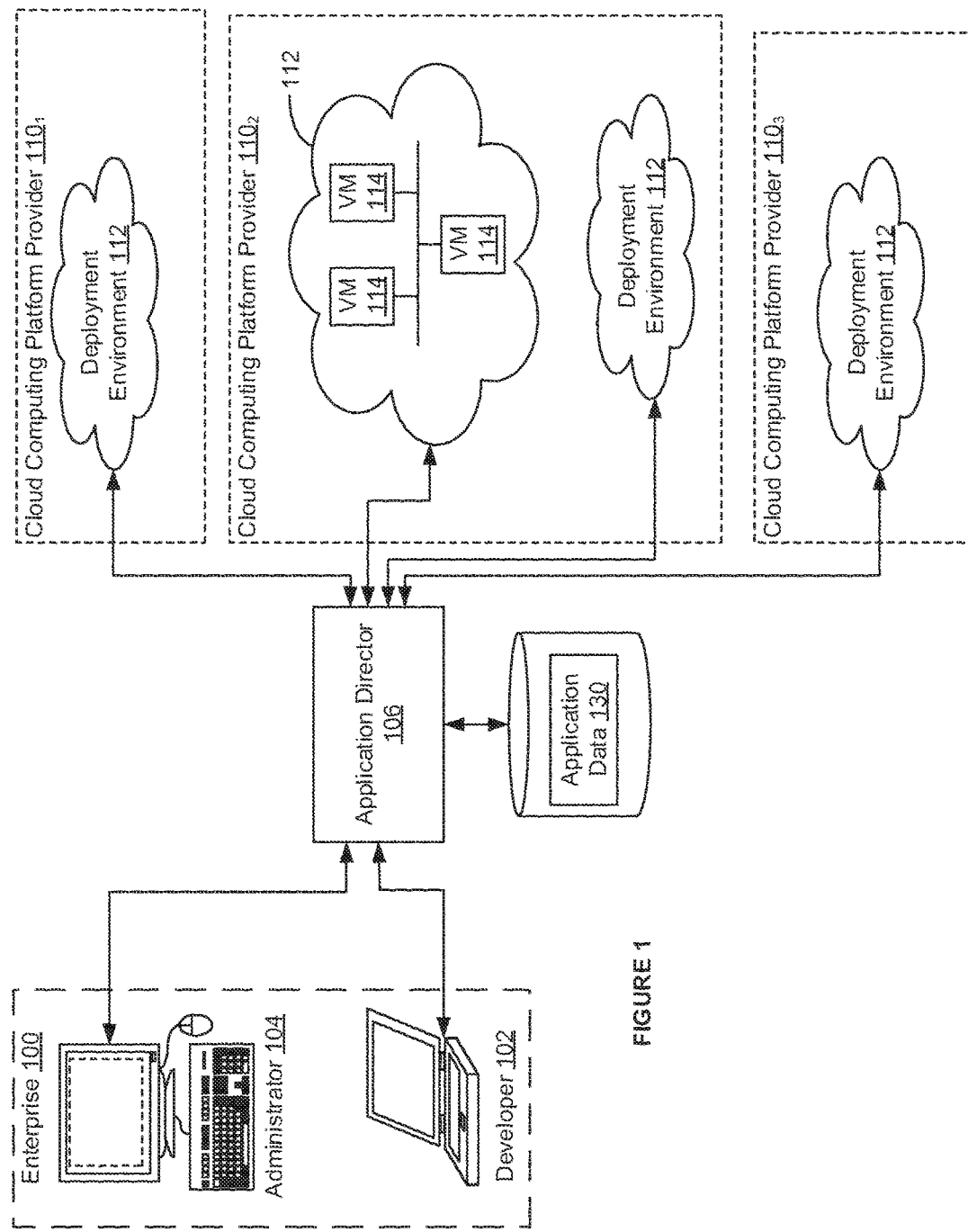
FIG. 1 depicts one embodiment of an application communicating with multiple cloud computing environments and cloud computing platform providers.

FIG. 1 depicts one embodiment of an application communicating with multiple cloud computing environments and cloud computing platform providers. In this embodiment, a multi-tier application created by developer 102 is being deployed for enterprise 100 in a deployment environment 112 provided by cloud computing platform providers $110_1$, $110_2$ and $110_3$ (collectively "cloud computing platform providers 110," sometimes referred to simply as "cloud providers"). As depicted in FIG. 1, each cloud computing platform provider 110 may provide one or more deployment environments 112, for example, for development, testing, staging, and production of the application. Enterprise 100 may access services from cloud computing platform provider 110, for example, via REST (Representational State Transfer) APIs (Application Programming Interface) or any other client-server communication protocol. One particular implementation of a REST API for cloud computing services is vCloud Director API available from VMware, Inc. Cloud computing platform provider 110 provisions virtual computing resources (e.g., virtual machines, or "VMs," 114) to provide a deployment environment 112 in which enterprise 100 can deploy its multi-tier application.

A developer 102 of enterprise 100 uses an application director 106, which may be running in one or more VMs, to orchestrate deployment of a multi-tier application onto one of the deployment environments 112 provided by a cloud computing platform provider 110. Application director 106 may include one or more software modules for generating a logical topology of an application to be deployed, generating a deployment plan based on a blueprint that includes deployment settings (e.g., virtual computing resources' cluster size, CPU, memory, networks), and executing the deployment plan by communicating with cloud computing platform providers 110 to provision and configure VMs 114 in the deployment environments 112. Application data 130 includes one or more catalogs that are populated and customized by an administrator 104 (e.g., IT or system administrator), who enters in specifications, configurations, properties, and other details for items in the catalog(s).

In order to facilitate secure communication during deployment of the application, the application director 106 may be provided with one or more credentials managers, such as key managers and/or trust managers, that implement the necessary keys and/or certificates to authenticate and communicate with VMs in one or more of the cloud computing platform providers 110. It is understood that, from the perspective of application director 106, the VMs may be viewed as hosts, and as such, may be herein referred to interchangeably with "hosts." After the application has been deployed, application director 106 may be further utilized to monitor and modify (e.g., scale) the deployment. For example, the application director 106 may modify the deployment by provisioning (or removing) one or more additional VMs, deployment environments 112, and/or cloud computing platform providers 110. Consequently, even after an application has been deployed, keys and/or certificates may be added to or removed from the credentials data store when VMs associated with the application are modified, requiring the credentials managers implemented by application director 106 to be updated. Various techniques for updating credentials managers to add, delete, and modify keys and certificates are described below in conjunction with FIGS. 2-4.

Figure 2:
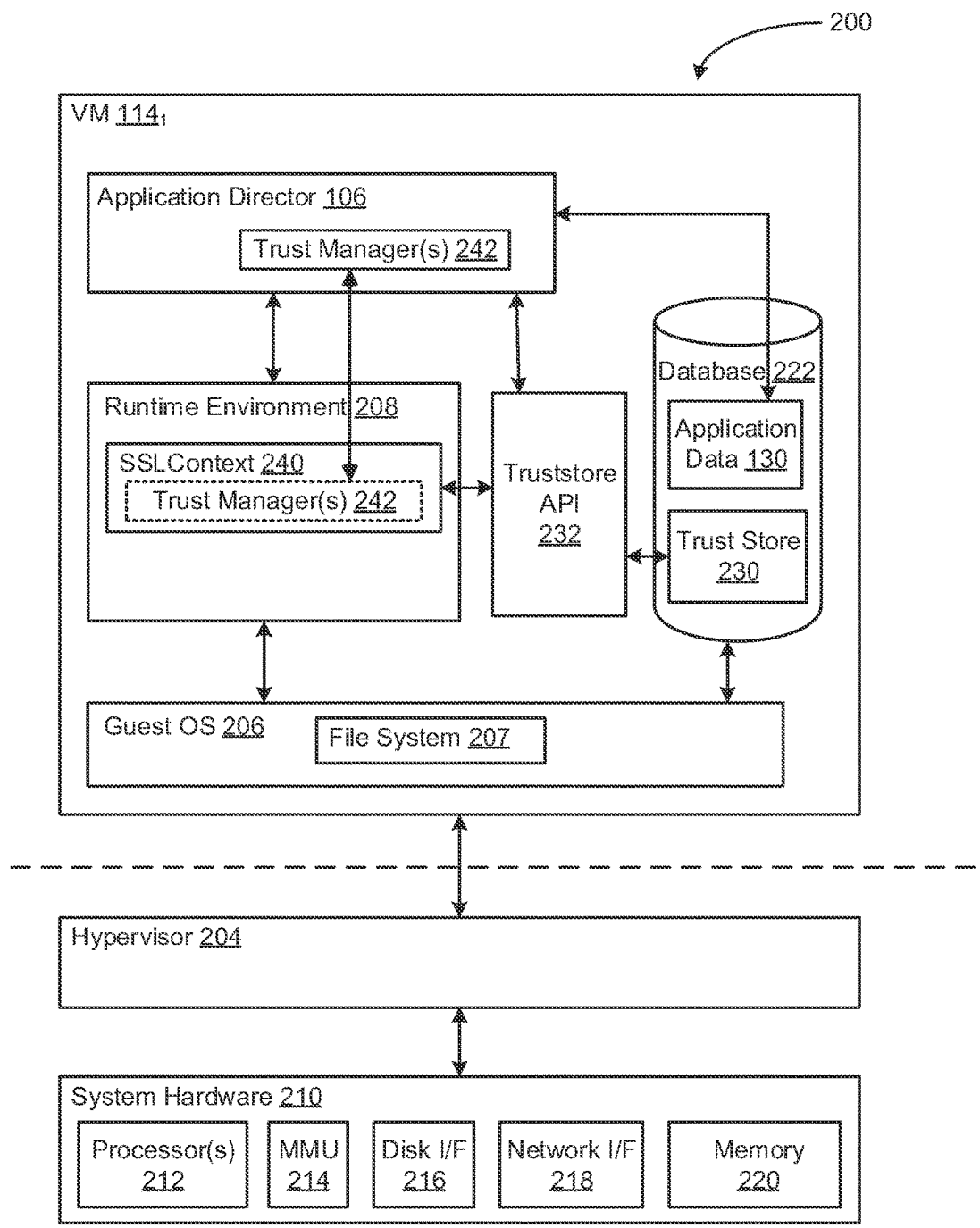
FIG. 2 is a block diagram that illustrates a virtualized computer system with which one or more embodiments of the present disclosure may be utilized.

FIG. 2 is a block diagram that illustrates a virtualized computer system 200 with which one or more embodiments of the present disclosure may be utilized. Computer system 200 (also referred to as a "server" or "host") is configured to support a virtualized environment comprised of one or more virtual machines.

As in conventional computer systems, computer system 200 includes both system hardware 210 and system software. System hardware 210 generally includes a processor 212, some form of memory management unit (MMU) 214 (which may be integrated with processor 212), a disk interface 216, a network interface 218, and memory 220 (sometimes referred to as "machine memory"). Machine memory 220 stores data and software such as an operating system and currently running application programs. Generally, MMU 214 is responsible for managing a virtual memory for processes running in computer system 200 by mapping virtual memory pages to machine memory pages. Processor 212 may be a single processor, or two or more cooperating processors in a known multiprocessor arrangement. Examples of disk interface 216 are a host bus adapter and a network file system interface. An example of network interface 218 is a network adapter, also referred to as a network interface controller (NIC). In some embodiments, a plurality of NICs is included as network interface 218. It should further be recognized that system hardware 210 also includes, or is connected to, conventional registers, interrupt handling circuitry, a clock, etc., which, for the sake of simplicity, are not shown in the figures.

One or more virtual machines (VMs), represented by VM $114_1$ to VM $114_N$ (VM $114_N$ omitted for clarity), are configured within computer system 200 and share the hardware resources of computer system 200. Each virtual machine typically includes a guest operating system (OS) 206 and virtualized system hardware (not shown), which includes one or more virtual CPUs, virtual system memory, one or more virtual disks, one or more virtual devices, etc., all of which are implemented in software to emulate the corresponding components of an actual computer. Guest OS 206 included in each virtual machine includes a file system 207, which stores various files and libraries associated with applications that are run on guest OS 206.

The virtual machines run on top of a hypervisor 204, which is a software interface layer that abstracts system hardware 210 into virtualized hardware, thereby enabling sharing of system hardware 210 of computer system 200 amongst the virtual machines. Hypervisor 204 acts as an interface between VM $114_1$ and system hardware 210 for executing VM-related instructions and for transferring data to and from machine memory 220, processor(s) 212, disk interface 216, etc. Hypervisor 204 may run on top of an operating system of computer system 200 or directly on hardware components of computer system 200.

VM $114_1$ is configured to support a runtime environment 208 and a database 222 running on top of guest OS 206. To simplify the description, description of other VMs $114_N$ (not shown) are omitted, but it should be understood that other VMs $114_N$ may be configured similarly to VM $114_1$. In the embodiments illustrated herein, runtime environment 208 is a Java Virtual Machine (JVM) and database 222 is a structured query language (SQL) database, such as MySQL, although it should be recognized that other runtime environments, databases, and/or applications running on top of the guest OS 206, such as web servers, etc., may be used without departing from the scope of the teachings herein. The embodiments presented should therefore not be interpreted to be exclusive or limiting, but rather exemplary or illustrative. Runtime environment 208 may include an interpreter, a heap, and a garbage collector to support execution of one or more applications (e.g., application director 106) within runtime environment 208. Interpreter is configured to translate and execute software code (i.e., byte code) of one or more applications. Garbage collector is a memory manager for runtime environment 208 that attempts to reclaim heap memory occupied by objects in heap no longer used by runtime environment 208 or applications running therein. Heap comprises a region of memory (referred to herein as "heap memory") reserved for storing one or more objects (e.g., Java objects) and other data structures utilized during execution of an application.

Runtime environment 208 is configured to run one or more applications to provide, for example, web services, database services, and other information technology services that may involve retrieval, processing, and serving of data to one or more users. Additionally, as shown, runtime environment 208 is configured to run application director 106 to orchestrate deployment of an application onto one or more deployment environments 112. To enable application director 106 to authenticate and communicate with various hosts included in deployment environment(s) 112, application director 106 may be provided with one or more credentials managers, such as trust manager(s) 242, which implement authentication certificates and/or cryptographic keys received from hosts and/or certificate authorities (CAs). Accordingly, credentials managers enable application director 106 to verify the identities of hosts within deployment environment(s) 112 and engage in trusted communication with the hosts.

Runtime environment 208 of VM $114_1$ is configured to generate a credentials object that includes, references, and/or otherwise implements various types of credentials, such as authentication certificates, public keys, private keys, secret keys, etc. that are used by application director 106 to identify and communicate with different hosts. In the embodiments illustrated herein, the credentials object is an SSLContext object 240 (also referred to as "SSLContext 240") that includes one or more trust managers 242, although it should be recognized that other types of credentials objects that include (or are associated with) other types of cryptographic keys, authentication certificates, credentials, trust managers, key managers, etc. may be used without departing from the scope of the teachings herein. When generating SSLContext 240, one or more trust managers 242 and/or key managers (not shown) may be created and provided to application director 106. Trust manager(s) 242 are used by application director 106 to determine whether authentication credentials received from a remote host should be trusted. Each trust manager 242 may support one or more authentication protocols, such as secure sockets layer (SSL), transport layer security (TLS), and the like. Although not shown in FIG. 2, SSLContext 240 may further include or be associated with one or more key managers that may be used to determine which credentials should be sent to a remote host during authentication.

DYNAMIC DATABASE AND REST API BACKED CREDENTIALS DATA STORE

In conventional virtual machine implementations, SSLContext is generated when a runtime environment is launched on a guest OS. More specifically, upon launch of a runtime environment, conventional implementations access keys and certificates stored in the file system of the guest OS and use the keys and certificates to generate SSLContext and trust managers and/or key managers associated with SSLContext. However, in order for an administrator to add a host to a list of trusted hosts, the administrator must manually add the key(s) and certificate(s) associated with the new host to the file system, for example, via a command line interface. Further, in conventional virtual machine implementations, applications running within the runtime environment are isolated from the credentials store, which is typically stored on the file system of the guest OS. Consequently, in order to generate a new SSLContext object using the key(s) and certificate(s) associated with the new host, the runtime environment—as well as any applications running on the runtime environment—must be restarted, requiring the virtual machine to be temporarily taken offline.

In contrast to the conventional virtual machine implementations described above, various embodiments of the disclosure enable application director 106 to modify a listing of trusted hosts—as well as credentials associated with the trusted hosts—without restarting runtime environment 208 by storing host credentials in a database 222 that can be accessed by application director 106. More specifically, as shown in FIG. 2, application director 106 may access credentials stored in a trust store 230 via a truststore API 232, which may implement a REST API library, such as Apache HttpClient. By storing credentials in database 222, instead of in file system 207 of guest OS 206, administrator 104 is able to update trust store 230 included in database 222 through the user interface of application director 106 using simple commands, such as GET, POST, PUT and DELETE. Consequently, trust store 230 may be dynamically updated to modify credentials using applications running on runtime environment 208, without requiring runtime environment 208 to be taken offline and restarted.

In the embodiments illustrated herein, database 222 includes trust store 230, which stores one or more credentials, such as public keys, private keys, secret keys, certificates, etc. However, it should be recognized that credentials associated with different hosts may be stored in other types of databases and data stores, such as a key store, and that the terms "trust store," "key store," "credentials store," and "credentials data store" may be used interchangeably without departing from the scope of the teachings herein.

In some embodiments, application director 106 may monitor API commands issued to truststore API 232 to determine when SSLContext 240 should be reconstructed. For example, application director 106 may determine that SSLContext 240 should be reconstructed when credentials have been added to or removed from trust store 230. Further, because database 222 can communicate with application director 106 via truststore API 232, upon detecting changes to trust store 230, SSLContext 240 may be reconstructed and injected back into application director 106 without restarting runtime environment 208 or application director 106. Accordingly, application director 106 can dynamically add or remove hosts to and from a multi-tiered application without requiring administrator 104 to manually modify the contents of file system 207 and take runtime environment 208 offline in order to generate an updated SSLContext object.

In embodiments that implement a REST API, when credentials stored in trust store 230 are modified, SSLContext 240 may be reconstructed using a library method configured to return an SSLContext object 240 that includes the updated credentials (e.g., SSLContext.getInstance( ), SSLContext.getDefault( )). The updated SSLContext 240 may then be injected back into runtime environment 208 as the default SSLContext 240. In some embodiments, SSLContext 240 may be reconstructed each time application director 106 attempts to connect to a host. In the same or other embodiments, application director 106 may monitor truststore API 232 and cause SSLContext 240 to be reconstructed each time credentials in trust store 230 are modified.

As described above, in conventional implementations, SSLContext 240 is generated using credentials stored in the file system of the guest OS. As such, one or more custom libraries (e.g., Java Runtime Engine (JRE) libraries) may be included in runtime environment 208 in order to enable SSLContext 240 to be generated using credentials stored in database 222, instead of accessing the credentials from file system 207. Additionally, trust manager(s) 242 may be customized to read credentials included in tuples stored in database 222 instead of reading the tuples from file system 207.

By storing host credentials on database 222, the credentials may be backed up, moved, and restored in a manner that is similar to backing up and restoring application data when an application running on runtime environment 208 is moved to a new host. For example, when an administrator 104 wishes to move application director 106 to a different VM 114 or runtime environment 208, the contents of database 222, including application data 130 and trust store 230, may be backed up without the need for accessing file system 207 of guest OS 206.

In some embodiments, trust store 230 includes a relational database that is organized according to a relational model. In such embodiments, each data item included in the relational database may be associated with a row of attributes that may include, for example, a host name, tenant identifier, public key, private key, secret key, certificate, etc. associated with one or more hosts. Trust store 230 may then be queried by a database management system, such as MySQL, (e.g., via trust store API 232) to access one or more data items (e.g., tuples) included in the relational database in order to facilitate communication with and/or authentication of a particular host. In some embodiments, trust store 230 includes a tenant column to enable credentials to be stored and accessed by multiple tenants that are running an application on runtime environment 208. In other embodiments, trust store 230 includes a separate table and/or relational database to manage the credentials associated with each tenant.

Figure 3:
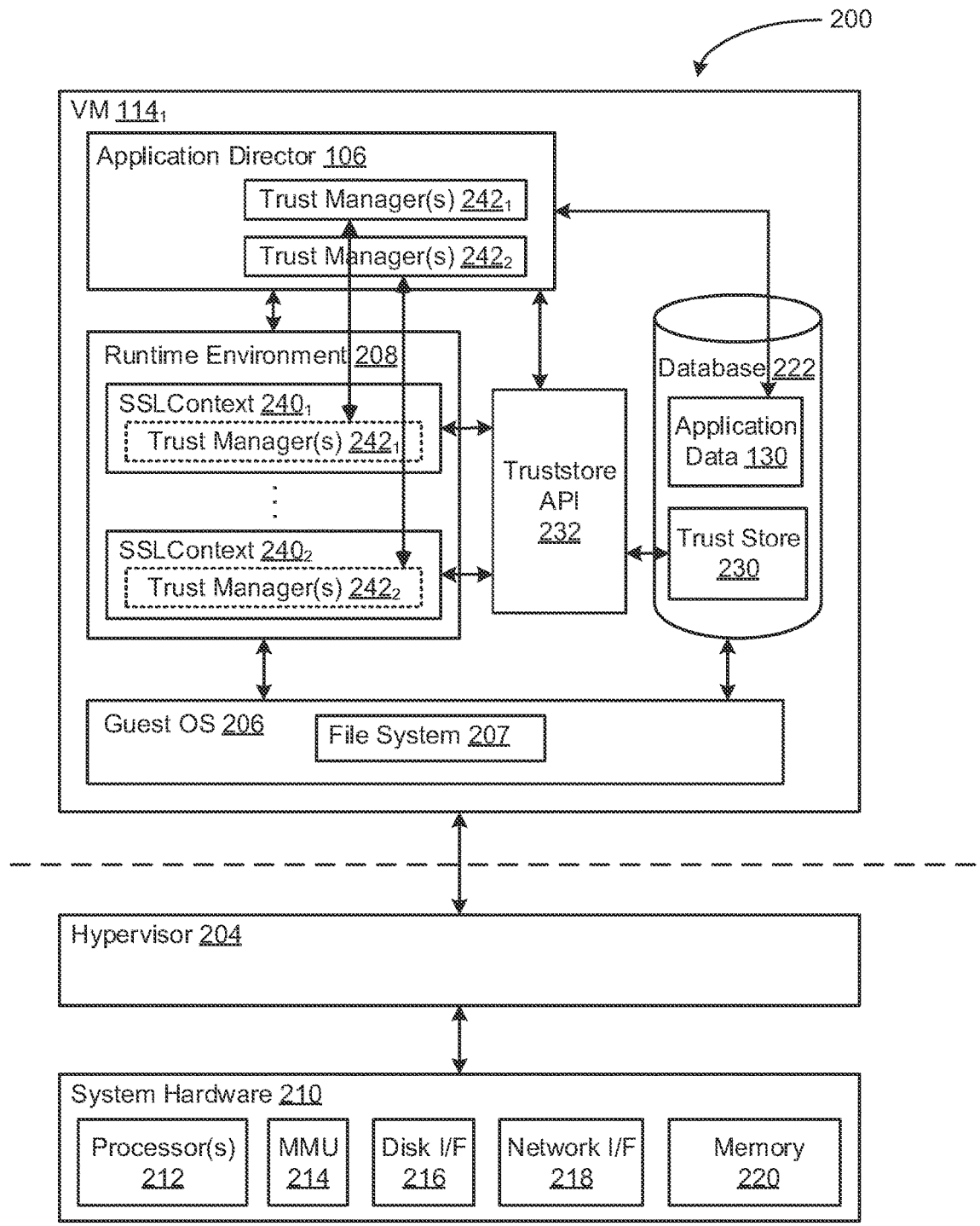
FIG. 3 is a block diagram that illustrates a multiple-tenant configuration of the virtualized computer system of FIG. 2 with which one or more embodiments of the present disclosure may be utilized.

FIG. 3 is a block diagram that illustrates a multiple-tenant configuration of the virtualized computer system 200 of FIG. 2 with which one or more embodiments of the present disclosure may be utilized. As shown, multiple SSLContext objects 240, illustrated as SSLContext $240_1$ to SSLContext $240_N$, may be generated such that each SSLContext 240 is associated with one or more different tenants that are running an application on runtime environment 208. For example, when a particular tenant is running application director 106 on runtime environment 208, the tenant is able to establish trusted communication with only those VMs associated with the tenant; other credentials in trust store 230 associated with other tenants are off-limits. Credentials associated with the trusted host(s) selected by the tenant are then used to generate SSLContext 240 and one or more trust managers 242. Then, a different set of trust managers 242, illustrated as trust manager(s) $242_1$ to trust manager(s) $242_N$, may be injected into application director 106 for each tenant, enabling each tenant to authenticate and securely communicate with a different set of hosts. Further, each tenant may manage their own trust store 230 via truststore API 232, such as by modifying credentials stored in their trust store 230, and/or determine whether certain host credentials (e.g., hostname) need to be validated before establishing a connection with a host. For example, as shown in FIG. 3, SSLContext $240_1$ and trust manager(s) $242_1$ may be generated for Tenant 1. Tenant 1 may then modify host credentials stored in database 222 via truststore API 232 in order to add, remove, modify, etc. credentials associated with one or more hosts. An updated SSLContext $240_1$ and trust manager(s) $242_1$ may then be reconstructed based on the modified credentials. In addition, Tenant 1 may modify a custom set of preferences associated with trust manager(s) $242_1$, for example, in order to specify whether the trust manager(s) $242_1$ should validate a hostname associated with a particular host or accept credentials (e.g., a certificate) without validating the hostname.

Conventional runtime environments are capable of generating and implementing only a single SSLContext object. Consequently, conventional runtime environments are ill-suited for multiple-tenant environments in which each tenant wishes to select their own trusted hosts. Accordingly, in various embodiments of the disclosure, multiple SSLContext objects 240 (e.g., SSLContext $240_1$ to SSLContext $240_N$), each of which is associated with one or more tenants, may be generated and referenced using proxies. That is, when a particular tenant attempts to access SSLContext 240 and/or trust manager(s) 242, the runtime environment 208 and/or other software running on guest OS 206 may act as a proxy by retrieving the specific SSLContext 240—included in SSLContext $240_1$ to SSLContext $240_N$—associated with that tenant, and transmitting that specific SSLContext 240 and/or the associated trust manager(s) 242 to application director 106. Thus, as shown in FIG. 3, application director 106 may receive multiple sets of trust managers 242, each of which are associated with a different tenant or set of tenants. In some embodiments, SSLContext 240 and/or trust manager(s) 242 may be proxied using an aspect-oriented programming (AOP) framework, such as Spring™.

Figure 4:
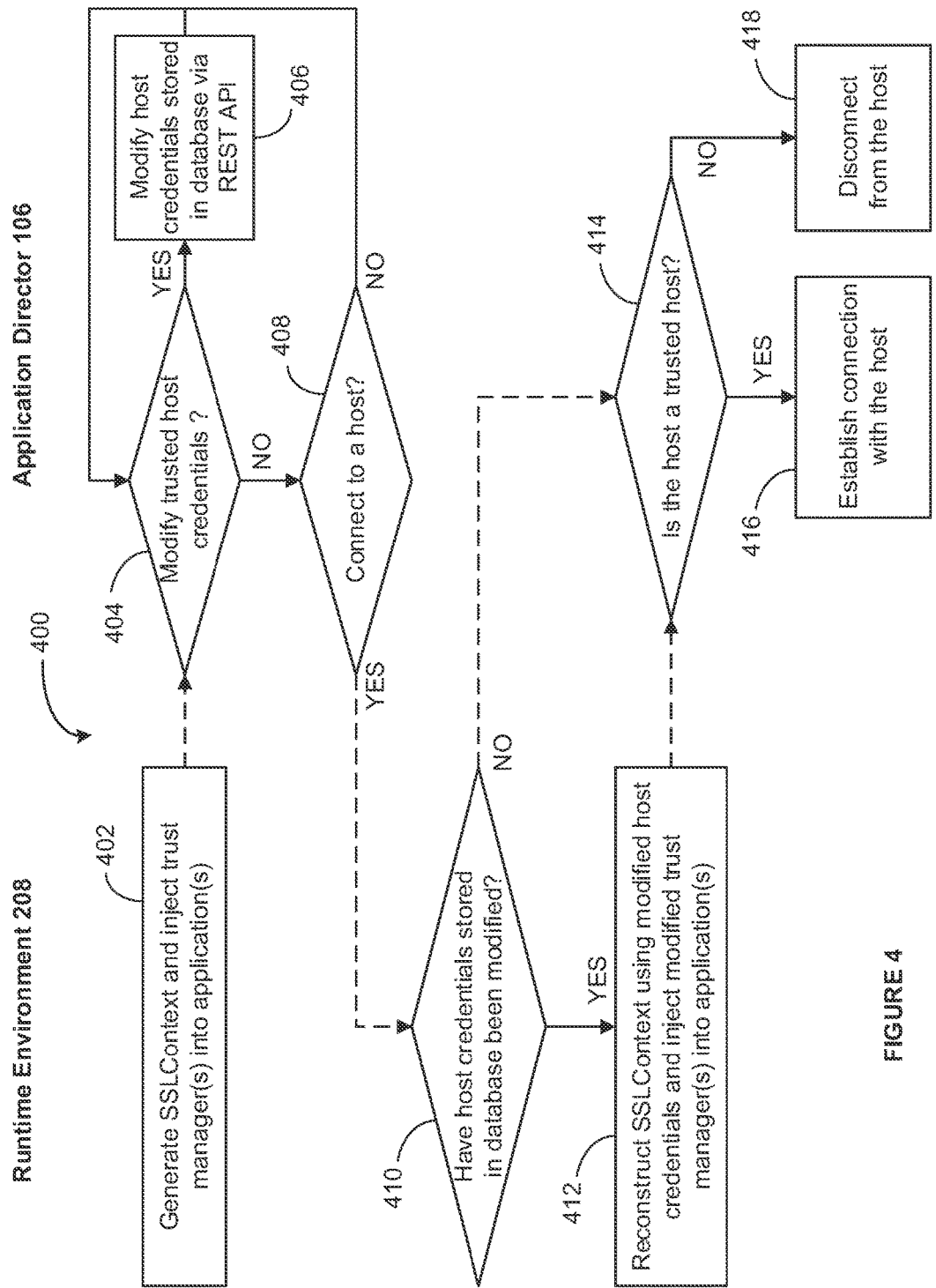
FIG. 4 is a flow diagram of an exemplary method performed by runtime environment and application director to manage trusted host credentials stored in database.

FIG. 4 is a flow diagram of an exemplary method 400 performed by runtime environment 208 and application director 106 to manage trusted host credentials stored in database 222. It should be recognized that, even though the method 400 is described in conjunction with the systems of FIGS. 1-3, any system configured to perform the method steps is within the scope of embodiments of the disclosure.

In step 402, runtime environment 208 generates SSLContext 240 and trust manager(s) 242 associated with SSLContext 240 using credentials stored in database 222. Trust manager(s) 242 are then injected into one or more applications (e.g., application director 106) running on runtime environment 208. In step 404, application director 106 determines whether one or more credentials stored in database 222 are to be modified. For example, credentials stored in database 222 may be modified when, for example, input is received from an administrator 104 via trust store API 232 to add, remove, modify, etc. one or more keys, certificates, etc. stored in database 222. If credentials are to be modified, the method 400 proceeds to step 406, where application director 106 interacts with database 222 via an API, such as via trust store API 232, to modify credentials stored in database 222. The method 400 then proceeds to step 408. If no credentials are modified, the method 400 proceeds to step 408.

In step 408, application director 106 determines whether a host connection is being requested. A host connection may be requested when, for example, an outgoing connection request is transmitted to a remote VM to configure the VM as part of a deployment of a multi-tiered application in a deployment environment 112. If a connection to a host is not being requested, then the method returns to step 404. If a connection to a host is being requested, then, in step 410, runtime environment 208 determines whether credentials stored in database 222 have been modified. In some embodiments, in step 410, runtime environment 208 determines whether credentials stored in database 222 have been modified since a host connection was last requested by the application director 106 and/or by a remote host attempting to connect to the application director 106.

If runtime environment 208 determines that credentials stored in database 222 have been modified, then, in step 412, runtime environment 208 retrieves the modified credentials from database 222 (e.g., using trust store API 232), reconstructs SSLContext 240 using the modified credentials, and injects modified trust manager(s) 242 associated with the reconstructed SSLContext 240 into application director 106. The method 400 then proceeds to step 414. If runtime environment 208 determines that credentials stored in database 222 have not been modified, then, in step 414, application director 106 verifies that the host is a trusted host using trust manager(s) 242. If application director 106 determines that the host is a trusted host, then, in step 416, a connection is established between application director 106 and the host. If application director 106 determines that the host is not a trusted host, then, in step 418, application director 106 disconnects from the host.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. For example, while embodiments herein have referred to certain methods for establishing communication between application director 106 and a remote host, it should be recognized that any type of application running on runtime environment 208 may be utilized in alternative embodiments. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of managing credentials using a runtime environment, the method comprising:
    adding one or more keys to a first credentials data store using a first application programming interface (API) command;
    retrieving the one or more keys from the first credentials data store using a second API command;
    generating a first credentials object based on the one or more keys retrieved from the first credentials data store, while the runtime environment is launched;
    verifying first host credentials received from a first remote host by an application running on the runtime environment using the first credentials object;
    detecting, via the application running on the runtime environment, a change to the first credentials data store;
    in response to detecting the change to the first credentials data store, generating a second credentials object based on a plurality of keys included in the first credentials data store; and
    transitioning from the first credentials object to the second credentials object without restarting the application.

2. The method of claim 1, wherein the first API command is included in a representational state transfer (REST) API.

3. The method of claim 1, wherein the first credentials object comprises an SSLContext object.

4. The method of claim 1, further comprising:
    deleting a key from the first credentials data store using a third API command, wherein a plurality of keys remain in the first credentials data store after deleting the key; and
    retrieving the plurality of keys from the first credentials data store using the second API command;
    generating a second credentials object based on the plurality of keys retrieved from the first credentials data store; and verifying second host credentials received from a second remote host by the application running on the runtime environment using the second credentials object.

5. The method of claim 4, wherein verifying the first host credentials and verifying the second host credentials are performed without restarting the application running on the runtime environment.

6. The method of claim 1, further comprising:
retrieving a plurality of keys from a second credentials data store using the second API command;
generating a second credentials object based on the plurality of keys retrieved from the second credentials data store;
associating the first credentials object with a first tenant; and
associating the second credentials object with a second tenant.

7. The method of claim 6, further comprising:
accessing the first credentials object via a first proxy associated with the first tenant;
verifying first host credentials received by the first tenant using the first credentials object;
accessing the second credentials object via a second proxy associated with the second tenant; and
verifying second host credentials received by the second tenant using the second credentials object.

8. The method of claim 1, wherein accessing the first credentials data store and adding the one or more keys to the first credentials data store are performed by the application running on the runtime environment.

9. A non-transitory computer-readable storage medium comprising instructions that, when executed in a computing device, manage credentials using a runtime environment, by performing the steps of:
adding one or more keys to a first credentials data store using a first application programming interface (API) command;
retrieving the one or more keys from the first credentials data store using a second API command;
generating a first credentials object based on the one or more keys retrieved from the first credentials data store, while the runtime environment is launched;
verifying first host credentials received from a first remote host by an application running on the runtime environment using the first credentials object;
detecting, via the application running on the runtime environment, a change to the first credentials data store;
in response to detecting the change to the first credentials data store, generating a second credentials object based on a plurality of keys included in the first credentials data store; and
transitioning from the first credentials object to the second credentials object without restarting the application.

10. The non-transitory computer-readable storage medium of claim 9, wherein the first API command is included in a representational state transfer (REST) API.

11. The non-transitory computer-readable storage medium of claim 9, wherein the first credentials object comprises an SSLContext object.

12. The non-transitory computer-readable storage medium of claim 9, further comprising instructions that, when executed in the computing device, perform the steps of:
deleting a key from the first credentials data store using a third API command, wherein a plurality of keys remain in the first credentials data store after deleting the key; and
retrieving the plurality of keys from the first credentials data store using the second API command;
generating a second credentials object based on the plurality of keys retrieved from the first credentials data store; and
verifying second host credentials received from a second remote host by the application running on the runtime environment using the second credentials object.

13. The non-transitory computer-readable storage medium of claim 12, wherein the instructions for verifying the first host credentials and the instructions for verifying the second host credentials, when executed in the computing device, do not require the application running on the runtime environment to be restarted.

14. The non-transitory computer-readable storage medium of claim 9, further comprising instructions that, when executed in the computing device, perform the steps of:
retrieving a plurality of keys from a second credentials data store using the second API command;
generating a second credentials object based on the plurality of keys retrieved from the second credentials data store;
associating the first credentials object with a first tenant; and
associating the second credentials object with a second tenant.

15. The non-transitory computer-readable storage medium of claim 14, further comprising instructions that, when executed in the computing device, perform the steps of:
accessing the first credentials object via a first proxy associated with the first tenant;
verifying first host credentials received by the first tenant using the first credentials object;
accessing the second credentials object via a second proxy associated with the second tenant; and
verifying second host credentials received by the second tenant using the second credentials object.

16. The non-transitory computer-readable storage medium of claim 9, wherein the instructions for accessing the first credentials data store and the instructions for adding the one or more keys to the first credentials data store are issued by the application when the application is executed in the computing device.

17. A computer system for managing credentials using a runtime environment, the computer system comprising a system memory and a processor programmed to carry out the steps of:
adding one or more keys to a first credentials data store using a first application programming interface (API) command;
retrieving the one or more keys from the first credentials data store using a second API command;
generating a first credentials object based on the one or more keys retrieved from the first credentials data store, while the runtime environment is launched;
verifying first host credentials received from a first remote host by an application running on the runtime environment using the first credentials object;
deleting a key from the first credentials data store using a third API command, wherein a plurality of keys remain in the first credentials data store after deleting the key; and
retrieving the plurality of keys from the first credentials data store using the second API command;

generating a second credentials object based on the plurality of keys retrieved from the first credentials data store; and verifying second host credentials received from a second remote host by the application running on the runtime environment using the second credentials object, wherein verifying the first host credentials and verifying the second host credentials are performed without restarting the application running on the runtime environment.

* * * * *